(12) United States Patent
Larson et al.

(10) Patent No.: US 9,910,235 B2
(45) Date of Patent: Mar. 6, 2018

(54) TELECOMMUNICATION ENCLOSURE HAVING INTEGRATED TERMINATION TOOLS

(71) Applicant: 3M INNOVATIVE PROPERTIES COMPANY, St. Paul, MN (US)

(72) Inventors: Donald K. Larson, Cedar Park, TX (US); Joseph C. Sawicki, Austin, TX (US); Zachary M. Thompson, Austin, TX (US); William J. Clatanoff, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/609,891

(22) Filed: May 31, 2017

(65) Prior Publication Data

US 2017/0261715 A1    Sep. 14, 2017

Related U.S. Application Data

(63) Continuation of application No. 15/001,659, filed on Jan. 20, 2016.

(Continued)

(51) Int. Cl.
*G02B 6/00* (2006.01)
*G02B 6/44* (2006.01)
(Continued)

(52) U.S. Cl.
CPC .......... *G02B 6/4439* (2013.01); *B24B 19/226* (2013.01); *G02B 6/3863* (2013.01); *G02B 6/4441* (2013.01); *G02B 6/4452* (2013.01)

(58) Field of Classification Search
CPC .... G02B 6/4452; G02B 6/4439; G02B 6/444; G02B 6/4441; G02B 6/4444; G02B 6/4446; G02B 6/445
(Continued)

(56) References Cited

U.S. PATENT DOCUMENTS

| | | |
|---|---|---|
| 4,979,334 A | 12/1990 | Takahashi |
| 5,577,149 A | 11/1996 | Averbeck et al. |

(Continued)

FOREIGN PATENT DOCUMENTS

| | | |
|---|---|---|
| CN | 203751929 | 8/2014 |
| CN | 203751930 | 8/2014 |

(Continued)

OTHER PUBLICATIONS

Brochure: 3M Fiber Interconnect Solutions, "High Performance Fiber Connections," 2013, 30 pp.

(Continued)

*Primary Examiner* — Robert Tavlykaev
(74) *Attorney, Agent, or Firm* — Janet Kling (57) ABSTRACT

A communication enclosure is described that includes an enclosure body having a first body portion and a second body portion. An adapter mounting mechanism is disposed in the first body portion, and a connector adapter mounted into the mounting mechanism that is configured to accept an optical fiber connector. The enclosure includes at least one integrated tool for terminating field mountable optical fiber connectors wherein the at least one integrated tool is disposed on one of the first body portion and the second body portion. In an exemplary aspect, the at least one integrated tool is a connector polishing platform.

19 Claims, 5 Drawing Sheets

Related U.S. Application Data (60) Provisional application No. 62/115,670, filed on Feb. 13, 2015.

(51) Int. Cl.
  *B24B 19/22* (2006.01)
  *G02B 6/38* (2006.01)

(58) Field of Classification Search
  USPC .................................. 385/134, 135, 139, 147
  See application file for complete search history.

(56) References Cited

U.S. PATENT DOCUMENTS

| | | |
|---|---|---|
| 6,721,484 B1 | 4/2004 | Blankenship |
| 6,777,617 B2 | 8/2004 | Berglund |
| 7,256,349 B2 | 8/2007 | Allen |
| 7,491,114 B2 | 2/2009 | Zhang |
| 7,593,613 B1 | 9/2009 | Clark |
| 7,860,363 B2 | 12/2010 | Kawasaki |
| 8,167,686 B2 | 5/2012 | Medeiros |
| 8,254,739 B2 | 8/2012 | Bylander |
| 8,442,375 B2 | 5/2013 | Bylander |
| 8,771,042 B2 | 7/2014 | Pepin |
| 8,920,049 B2 * | 12/2014 | Grandidge ........... G02B 6/2551 385/135 |
| 9,618,707 B2 * | 4/2017 | Leyva, Jr. ............ G02B 6/3898 |
| 2003/0156799 A1 | 8/2003 | Wada et al. |
| 2007/0172179 A1 * | 7/2007 | Billman ................ G01M 11/33 385/99 |
| 2010/0220953 A1 | 9/2010 | Kewitsch et al. |
| 2015/0043882 A1 | 2/2015 | Schomisch et al. |
| 2015/0079882 A1 | 3/2015 | Wang |
| 2015/0117822 A1 | 4/2015 | Hu |
| 2015/0346449 A1 | 12/2015 | Clatanoff |

FOREIGN PATENT DOCUMENTS

| | | | |
|---|---|---|---|
| JP | 09-288217 A | 11/1997 | |
| WO | WO 2012/112344 A1 * | 8/2012 | ............... G02B 6/38 |
| WO | WO 2013-159332 | 10/2013 | |
| WO | WO 2015-183942 | 12/2015 | |

OTHER PUBLICATIONS

"FOSC Ribbon Trays", TE Connectivity Ltd. [online]; (2015); URL <http://www.te.com/en/industries/telecom-networks-north-america/knowledge-center/videos.html> [retrieved from the internet on Feb. 24, 2015], 3 pp.

International Search Report for PCT/US2016/014064, dated Jun. 13, 2016, 3 pp.

* cited by examiner

TELECOMMUNICATION ENCLOSURE HAVING INTEGRATED TERMINATION TOOLS

FIELD

The present description relates to a communication enclosure having integrated termination tools disposed therein. In particular, an integral optical fiber polishing station is integrated into the exemplary communication enclosure.

BACKGROUND

Telecommunication cables are used for distributing data across vast networks. As telecommunication cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines. At each point where the cable is opened, it is necessary to provide some type of enclosure to protect the cable (and potentially unjacketed fiber) and allow easy and repeated access to the cable.

Recently, service providers are extending their fiber networks to the home in the United States, which requires more technicians to install fiber optic connectors in the field. Field mountable optical fiber connectors can be used to connect optical fibers within an enclosure, however the installation of these connectors can require the craftsman to have one or more kits that contain the tools needed to install a given optical fiber connector. Many telecommunication carriers and service personnel prefer installation that require as few tools as possible. However, fiber polishing is a necessary installation step when installing many different styles of optical fiber connectors in order to provide optimal levels of signal transmission. Eliminating the cost of a separate optical fiber connector polishing apparatus and space needed in craftsman's tool kit could enable more technicians to terminate optical fibers in the field with field mount optical fiber connectors, which will enable fiber to the home high-bandwidth, high-speed or gigabit service more quickly. Thus, there is a need to provide necessary tooling at job sites while minimizing the number of different tools that need to be carried.

SUMMARY

The present description relates to a communication enclosure. The communication enclosure includes an enclosure body that includes a first body portion and a second body portion. An adapter mounting mechanism is disposed in the first body portion, and a connector adapter mounted into the mounting mechanism that is configured to accept an optical fiber connector. The enclosure includes at least one integrated tool for terminating field mountable optical fiber connectors wherein the at least one integrated tool is disposed on one of the first body portion and the second body portion. In an exemplary aspect, the at least one integrated tool is a connector polishing platform.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "coupled with" or "in contact with" another element, component or layer, it can be directly on, directly coupled with, in direct contact with, or intervening elements, components or layers may be on, connected, coupled or in contact with the particular element, component or layer, for example. When an element, component or layer for example is referred to as being "directly on," "directly coupled with," or "directly in contact with" another element, there are no intervening elements, components or layers for example.

The present invention relates to a telecommunication enclosure having an integral optical fiber connector installation tooling such as an integral optical fiber polishing station. The telecommunication enclosures of the present invention are configured to allow the connection of at least two optical fibers with optical fiber connectors wherein at least one of the optical fiber connectors is a field mountable optical fiber connector. Exemplary telecommunication enclosures can include a telecommunication closure, a telecommunication closure/terminal, a telecommunication terminal, a distribution box, fiber drop box, a junction box, a remote terminal, a demarcation point, a fiber network interface device (NID), or an optical network terminal (ONT) located at a branch point in an optical network.

Exemplary field mount optical fiber connectors can include 3M™ Hot Melt Connectors, remote grip style optical fiber connectors such as 3M™ Crimplok™ Connectors or 3M™ Crimplok™+ Connectors, each of which is available from 3M Company (St. Paul, Minn.). Another exemplary remote grip optical fiber connector is described in detail in US Patent Publication No. 2015/0117822, entitled "Optical Fiber Connector", incorporated by reference herein in its entirety.

Figure 1:
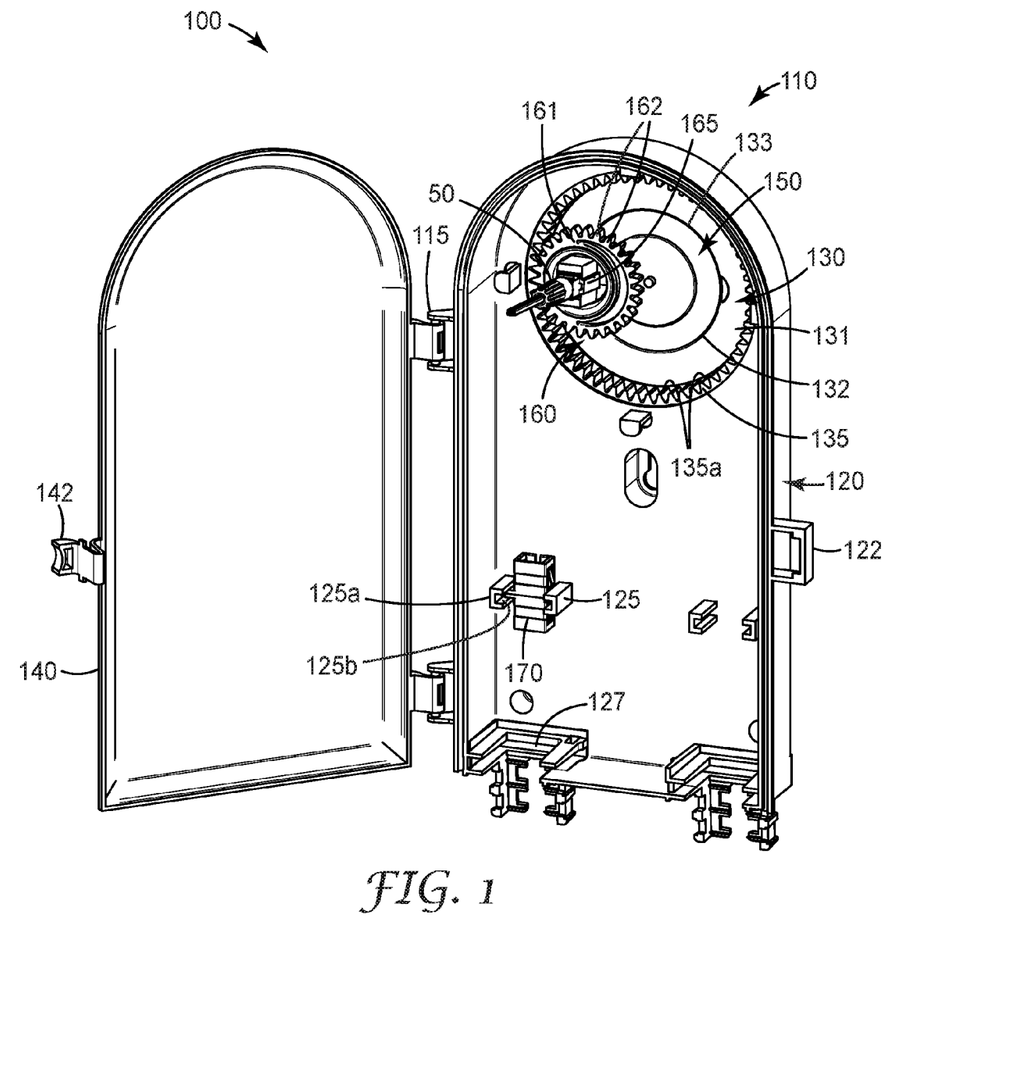
FIG. 1 is an isometric view of a first embodiment of a telecommunication enclosure having an integrated polishing platform according to the present description.

FIG. 1 shows an exemplary telecommunication enclosure (i.e. network interface device 100) according to the present description. Network interface device 100 generally includes an enclosure body 110 that includes a first body portion 120 and a second body portion 140 wherein the second body portion is hingeably attached to the first body portion. The second body portion can be pivoted away from the first body portion to provide access to the interior of the NID and can be closed and secured to the first body portion by a latch 142 on the second body portion that is received by catch 122 disposed on a side of the first body portion opposite hinge 115 connecting the first body portion to the second body portion.

Figure 2:
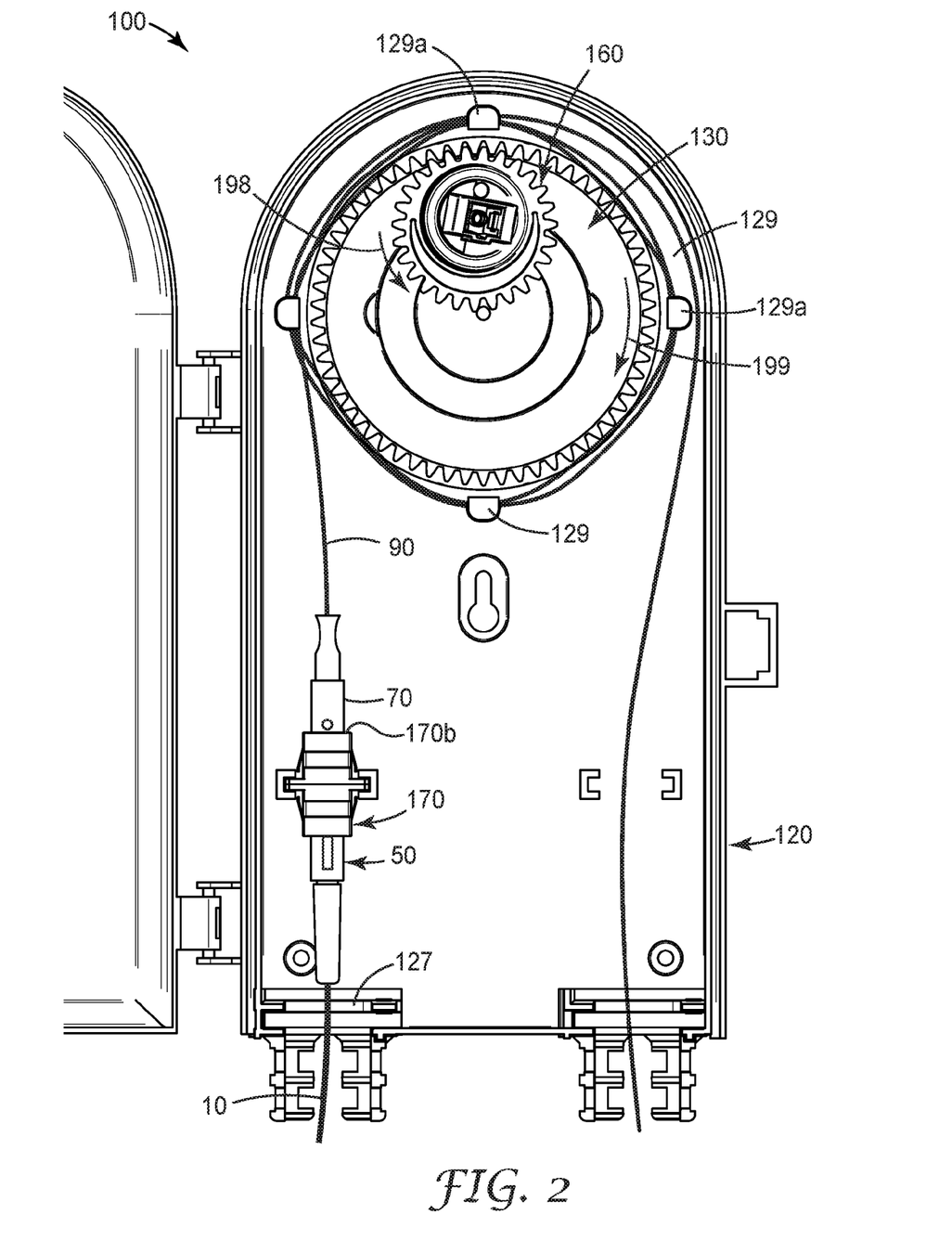
FIG. 2 is another view of a telecommunication enclosure of FIG. 1.

The first body portion 120 can further include at least one adapter retainer 125 extending from a bottom wall of the first body portion configured to accept and retain an optical fiber connector adapter 170. The at least one adapter retainer 125 can be aligned with a cable entry disposed in at least one sidewall of NID 100 that allows an external cable 10 (see FIG. 2) to enter into the interior of the NID. In one aspect, a field mount optical fiber connector 50 can be mounted on the terminal end of the exterior cable 10 and subsequently inserted into a first end 170a of the optical fiber connector adapter and a second optical fiber connector 70 disposed on the terminal end of an indoor cable 90 can be placed in a second side 170b of the connector adapter to create an optical connection as shown in FIG. 2. In an alternative aspect, the exterior cable can be pre-terminated having an optical fiber mounted thereon and the second optical fiber connector can be a field mount optical fiber connector. In yet another aspect both the optical fiber connectors mounted on the exterior cable and the indoor cable can be field mount connectors.

In the exemplary aspect shown in FIG. 1, the adapter retainer is composed of two facing, spaced apart box channel shaped uprights 125a,b. The channels in the box channel shaped uprights can be configured to accept the flange structure on a conventional optical fiber connector adapter 170.

The optical fiber cable 10 can be a conventional cable such as a 250 µm or 900 µm buffer coated fiber, Kevlar® reinforced jacketed fiber, a jacketed drop cable or other sheathed and reinforced fiber. The optical fiber of the optical fiber cable can be single mode or multi-mode. Example multi-mode fibers can have a 50 µm core size, a 62.5 µm core size, or a different standard core size. In another alternative aspect, the optical fiber cable can comprise a conventional plastic optical fiber. In yet another aspect, the optical fiber cable 10 can be an FRP drop cable, a 1.6 mm to 6.0 mm jacketed round drop cable, a flat drop cable, or other optical fiber drop cable. In an exemplary aspect, drop cables from a demarcation point can be connected to an indoor/outdoor type of 4.8 mm to 6 mm or approximately 3 mm fiber cable. Furthermore, drop cables can have ruggedized outdoor jacket with an inner flexible indoor/outdoor jacketed cable that could be field terminated in a field mount connector with this invention.

An integrated fiber polishing station can be disposed in one of the first body portion or the second body portion of the exemplary enclosure. The exemplary polishing station enables a craftsman to use a simple method of field polishing an optical fiber connector that can provide consistent, repeatable results without the need for a separate tool. The polishing station can be used in applications where the final optical end finishing step is completed after the optical fiber has been secured within an optical fiber connector.

In the aspect shown in FIG. 1, the integral fiber polishing station 130 is disposed in first body portion 120 of NID 100. The polishing station 130 includes a base portion 131 that can be integrally formed in the first body portion of NID 100. Base portion 131 supports a piece of polishing media 150 on a polishing platform 132 and includes a ring gear 135 extending from surface and adjacent to the exterior edge of the polishing platform. Ring gear 135 has a plurality of interior teeth 135a disposed along an interior circumferential edge of the base portion.

Polishing platform 132 can further include a depression, such as an annular channel 133, within the polishing platform 132 to aid in the holding of the polishing media 150, for example a ring shaped piece of polishing media as shown in FIG. 1. In an alternative embodiment, the depression can be circular if using a piece of round polishing media or rectangular when using a rectangular piece of polishing media.

The polishing media 150 can comprise a conventional polishing media or material. Depending on the type of polish, the polishing media 150 includes an abrasive material of larger grit size (e.g., 5-10 µm grit size) or a polishing media of a relatively finer grit-sized material (e.g., 0.02-0.05 µm grit size). For example, in one aspect, a ring shaped piece of 3M 869XW lapping film which has a nominal 0.01 µm silicon oxide grit (available from 3M Company, St. Paul, Minn.) may be utilized by placing it in annular channel 133 in the base portion 131 of the polishing platform. The polishing media 150 can be used in conjunction with a dry polish or a wet polish (e.g. water or alcohol). After a polishing operation is completed, the polishing media 150 can be removed from the polishing platform and replaced with a new piece of polishing media for the next polishing operation.

In a preferred aspect, the polishing media 150 can be backed by one or more compliant pads (not shown). Compliant pad can have a thickness of about 3 mm and a hardness of about 30 Shore A to about 80 Shore A, preferably about 45 shore A to about 75 shore A. However, the thickness of the compliant pad may vary depending on the depth of the annular channel, desired final fiber protrusion from the end of a connector ferrule after polishing as well as other system design criteria. In an exemplary aspect, the compliant pad can be made of rubber, for example, a silicone rubber material. In an alternative aspect, two compliant pads (not shown) can be utilized. In this instance, the physical properties of each pad can be altered to provide the desired polishing surface. Polishing media 150 can be held temporarily to the surface of the compliant pad by applying a small amount of water to the surface of the compliant pad and setting the polishing media on top. Alternatively, an adhesive backed polishing media can be used. In an exemplary aspect, an adhesive backed polishing media can be placed on the polishing platform in the factory which will improve the installation efficiency of NID 100, especially in embodiment that accepts only a few optical fiber connectors.

The depth of annular channel 133 can be greater than or equal to the combined thickness of compliant pad(s) and the polishing media 150 (i.e. the surface of the polishing platform 132 is either even with or slightly higher than the surface of the polishing media). This configuration allows the body of the polishing puck 160 (i.e. the polishing gear 161 and the connector mount 165) to ride on the surface of polishing platform 132. Configuring the polishing platform in this way helps eliminate some of the craft sensitivity found in conventional field polishing processes where the entire polishing puck rides on the surface of the polishing media which in turn is disposed on a compliant pad. In these conventional polishing processes, the craftsman can over polish the connector by pressing the polishing puck too hard against the surface of the polishing media or even cause an angled polish if they apply to much pressure to one side of the polishing puck.

The ring shaped configuration of the polishing media 150 and compliant pad disposed concentrically with the polishing platform 132 enables greater control of the force on the tip of the optical fiber secured in optical fiber connector 50. In an exemplary aspect, the appropriate contact force on the fiber tip being polished can be controlled to be from about 100 grams force to about 150 grams force, preferably about 130 grams force, depending on the length of the protruding fiber and the abrasive media. In an alternative aspect, the force on the ferrule tip can be controlled with a compression spring integrated into the connector mount 165 of polishing puck 160, which would bias the connector toward the polishing surface, and control the contact force on the ferrule tip. The combination of contact force, compliance of the polishing surface and shape of the ferrule tip cooperate to help provide a desired shape on the polished fiber surface.

NID 100 including the base portion 131 and the cover portion can be constructed from a rigid molding plastic. Molding plastics can include glass or mineral filled polymer resins, engineering resins or rigid thermoplastic resins. Exemplary molding plastics can include polycarbonate, polyoxymethylene such as is available as Delrin® 100 NC010 from DuPont (Wilmington, Del.), poly(acrylonitrile/butadiene styrene) and blends or copolymers thereof. An exemplary blend of ABS and PC is available from Ngai Hing Engineering Plastic Materials, Ltd. (D0530, China).

The polishing platform can further include a polishing puck 160 comprising a polishing gear 161 and a connector mount 165. The polishing gear has a plurality of exterior teeth 162 protruding from the circumferential edge of the polishing gear 161 as shown in FIG. 1. The exterior teeth can be configured to engage with the interior teeth of the ring gear 135 in the base portion 131 of the polishing station 130. The polishing gear 161 has a central opening passing therethrough to allow insertion of the connector mount 165 into the polishing gear. In an exemplary aspect, the central opening can be disposed off center from the center point of the polishing gear so that the connector mount can be positioned asymmetrically within the polishing gear. For example, the central axis of connector mount 165 can be displaced from the center point of the polishing gear 161 by about 1 mm to about 10 mm, preferably by about 2 mm to about 5 mm.

Connector mount 165 can be configured to rotate within the polishing gear as the polishing gear is moved around the inside of the ring gear 135 of the base portion 131 of the polishing station The connector mount 165 can be configured to receive a conventional optical fiber connector in the connector. Connector mount 165 is configured to releasably hold and secure optical fiber connector 10 and to provide a snug fit to hold connector, e.g., by a snap fit. The connector mount can be configured to match the format of the optical connectors which will be disposed in NID 100. For example the connector mount can have an SC format if the connector to be disposed in the NID has an SC format. Alternatively, the connector mount can have an LC format, an ST formant, an FC format, an MTP format or other common connector format utilized in field installable optical fiber connectors.

FIG. 1 shows an optical fiber connector 50 disposed in polishing puck 160. When the polishing puck 160 is placed in the polishing platform, the tip of the fiber protruding from the end of the connector ferrule is positioned against the polishing media 150 such that fiber tip experiences a contact force of from about 100 grams force to about 150 grams force against the polishing media, preferably about 130 grams.

NID 100 can further include a slack storage system 129 for retaining excess lengths of optical fiber, for example an excess length of indoor cable 90 can be stored within the NID as shown in FIG. 2. In an exemplary aspect, the slack storage system includes a plurality of retention tabs 129a disposed periodically around the optical connector polishing platform which can help guide and retain the excess length of indoor cable as shown.

A field mount connector 50 can be terminated on the end of cable 10 as follows. A strain relief boot can be threaded onto optical fiber cable 50. The optical fiber cable can be prepared by removing a terminal portion of the cable jacket. The fiber can then be stripped of its buffer coating using a conventional fiber cable stripper to expose the glass portion of the optical fiber. The fiber can be positioned into a field cleaver, such as the cleaver described in U.S. Pat. No. 8,254,739, incorporated by reference herein in its entirety, which describes a field cleaving operation, using e.g., a diamond coated wire. The cleaved fiber is then guided into and through optical fiber connector until the tip of the optical fiber exits the end face of ferrule. The fiber is either mechanically or adhesively secured in the connector and the boot positioned on the backside of the connector opposite the ferrule.

Optical fiber connector 10 is thus ready for polishing and can be inserted in the connector mount 165 of the polishing puck 160. The polishing media 150 (e.g., a die cut ring of 863XW lapping film from 3M Company, a 869XW lapping film from 3M Company, or other lapping film) disposed on the polishing platform can be wetted with DI water or other conventional polishing fluid. In another aspect, a dry polishing process may be used.

Polishing puck 160 is placed into the polishing platform such that a portion of the exterior teeth on the polishing gear 161 of the polishing puck engage with a portion of the interior teeth of the ring gear 135 which is a part of the base portion 131. The polishing gear is moved in a polishing direction around the interior circumference of the ring gear, for example in a direction indicated by arrow 199 shown in FIG. 2. Because the connector mount is rotationally mounted in to the polishing gear, the connector mount will rotate in a direction opposite the polishing direction as indicated by arrow 198 allowing the craftsman's hand to maintain a constant orientation with respect to the connector mount.

The length of the polish process is determined by the number of revolutions that the polishing puck travels around the inner circumference of polishing platform 130. For example, six revolutions can be equivalent to about one meter of travel of the tip of the optical fiber along the surface of the polishing media and eight revolutions can be to about one and a third meters of travel. Because the tip of the optical fiber travels multiple revolutions around the polishing platform, it is desirable that the traces of each revolution do not overlap or retrace the pattern from a previous revolution and a roulette pattern can be traced on the polishing media 150 by the tip of the optical fiber during a typical polishing process. Specifically, the roulette pattern forms a hypocycloid as a result of the polishing gear of the polishing puck rolling along the inner circumference of the ring gear. In order to form this hypocycloid pattern, the ratio between the number of interior teeth on the ring gear and the number of exterior teeth on the polishing gear is selected to have a non-integer value.

This polishing procedure can produce a polished fiber tip having a protrusion of about 15 µm (±10 µm) and a convex shape with an apex offset of ≤50 µm, preferably ≤15 µm. After the polishing procedure, the fiber tip may be cleaned with an alcohol wipe. For the next connector polishing operation, the polishing media 150 can be replaced with a new film and the polishing platform is ready to polish the next connector once it has been mounted in the polishing puck.

In an alternative aspect, more than one polishing media 150 can be utilized to polish a connector. For example, for hot melt connector, a first polishing media having a relatively coarse grit can be utilized to remove excess adhesive and reduce the length of the protruding fiber. After the procedure described above is completed, the polishing puck is removed from the polishing platform and the polishing media is replaced by a piece of finer grit polishing media. The polishing puck is reintroduced into the polishing platform and rotated around the interior circumference of the polishing platform the desired number of additional revolutions to achieve the final end face polish of the connector.

After polishing, the optical fiber connector 50 is extracted from the polishing puck and inserted into optical fiber connector adapter 170 to make the optical connection with another optical fiber connector.

The polishing puck can be stowed in the NID by placing it in or on a puck containment structure (not shown).

The polishing platform in NID 100 is shown as being generally circular in FIGS. 1 and 2. However, the polishing platform can have other shapes so long as the polishing puck can be guided around the interior of the ring gear in a continuous fluid motion.

Figure 3:
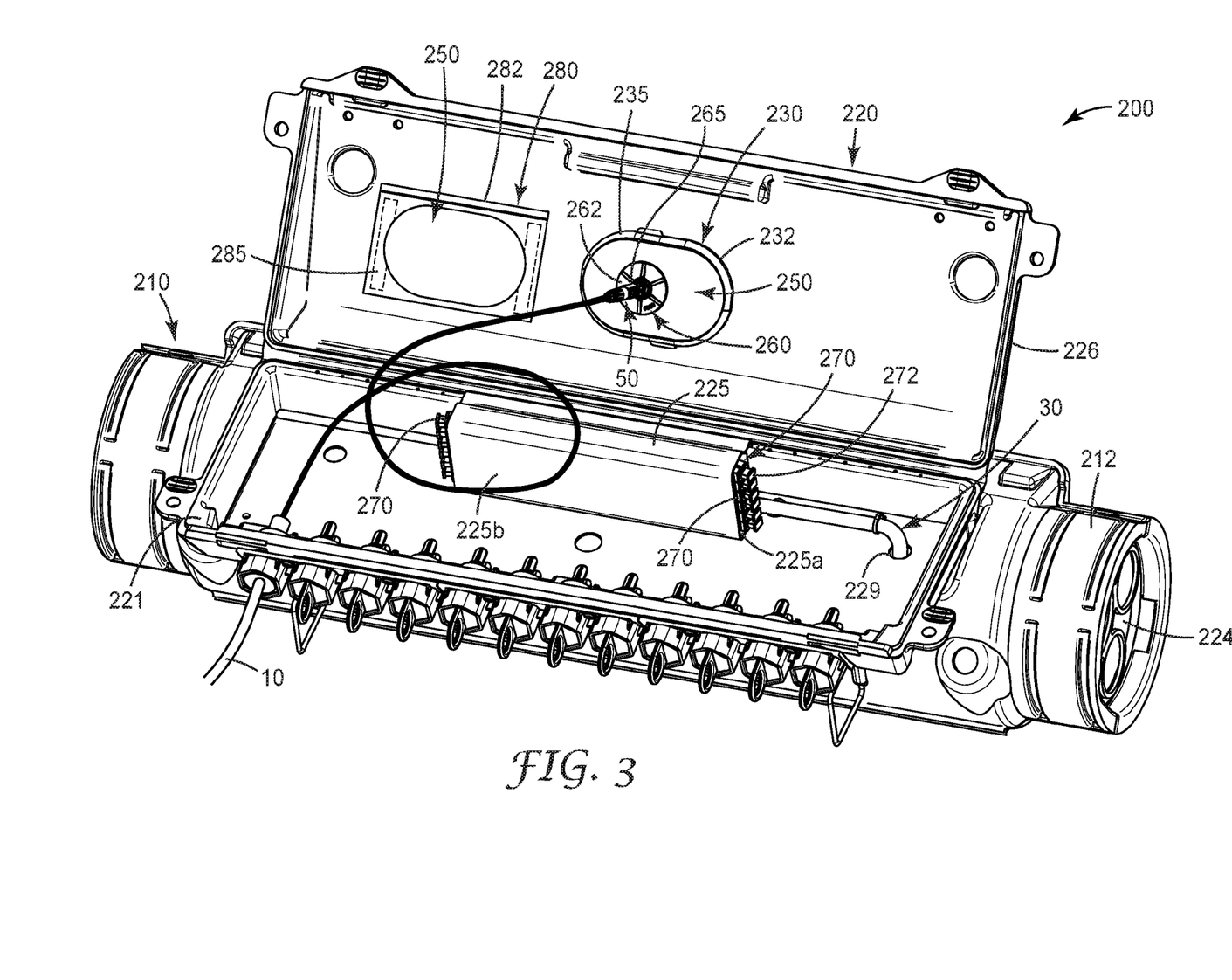
FIG. 3 is an isometric view of a second embodiment of a telecommunication enclosure having an integrated polishing platform according to the present description.

FIG. 3 shows another embodiment of a communication enclosure in the form of a closure/terminal 200 that includes an integrated having an enclosure having comprises an optical fiber polishing station. An exemplary closure/terminal is described in detail in commonly owned U.S. Pat. No. 6,777,617, incorporated by reference herein in its entirety.

Closure/terminal 200 includes a separate splice closure compartment 210 and a terminal closure compartment 220 mounted on one side of the splice closure compartment. The closure/terminal 200 may be adapted to be suspended from a support cable (not shown) by means of a pair of hangers.

In use, the closure/terminal can enclose and protect a telecommunication cable where the cable is "spliced into" for distribution of a signal to one or more locations. For example, a telecommunication cable may contain a plurality of data lines and at a predetermined point, the cable is spliced into and signals from one or more of the plurality of data lines are routed away from the main cable and distributed to "branches" of the network or to final drop locations. In the example of a fiber optic telecommunication cable, the cable may contain a plurality of buffer tubes, with each buffer tube containing a plurality of individual optical fibers. At various points along the cable, it may be desired to branch off optical fibers of one or more buffer tubes, but not all of the optical fibers in the cable. The individual optical fibers of a buffer tube may be spliced directly to a corresponding drop line, or the individual optical fibers may be split, such as by using a splitter or coupler, so that the signals in a single fiber are distributed to more than one drop line.

Splice closure compartment 210 comprises an elongated, generally cylindrical casing 212 comprising first and second casing sections which may be opened along an edge or opening seam, having mating ridges and grooves to form a labyrinth-type seal for restricting the ingress of dirt, water, bugs, and the like, into casing. The cylindrical casing can be maintained and secured in a closed condition by latch or other fastening device and includes a pair of end seals 224 disposed adjacent to each end of the splice closure compartment to allow cables to enter and exit said compartment.

Terminal closure compartment 220 includes a first body portion 221 and a second body portion 226 wherein the second body portion is hingeably attached to the first body portion. The second body portion can be pivoted away from the first body portion to provide access to the interior of the terminal closure compartment and can be closed and secured to the first body portion by a latch.

The terminal closure compartment 220 can further include at least one adapter retainer 225 mounted to one of the first body portion and the second body portion that is configured to accept and retain at least one optical fiber connector adapter. In the exemplary aspect shown in FIG. 3, the adapter retainer can be provided for establishing connection between the spliced telecommunication lines that enter the terminal closure compartment from the splice closure compartment through opening 229 and one or more drop lines, such as drop line 10 extending outside of the terminal closure compartment 220.

Adapter retainer 225 forms a patch panel 225a that supports a plurality of optical fiber connector adapters 270 configured to interconnect optical fiber connectors disposed on the ends of spliced telecommunication lines routed from the splice closure compartment to connectors on the terminal end of drop lines or cables. Those skilled in the art will recognize that connectors on either the spliced lines or the drop lines can be any suitable connector such as a field mountable optical fiber connector. For example, the optical fiber connectors can be SC, ST, FC or LC format connectors, and may be, for example, either positive contact (PC) or angled polished connector (APC) types of connectors.

In an exemplary aspect, the spliced telecommunication lines from the splice closure compartment 221 can be disposed in a protective tube 30 as they are routed from the splice closure compartment to the terminal closure compartment.

In one exemplary aspect, patch panel 225a has a lid 225b which may be opened to allow access to the back sides of the plurality of connector adapters 270 (such as may be required for cleaning or installing the optical fiber connectors on the spliced telecommunication lines routed into the terminal closure compartment from the splice closure compartment). Lid 225*b* is preferably securable such that access to the back sides of the plurality of connector adapters is limited to authorized users only. This allows the connectors on the spliced telecommunication lines to be inserted into the backside of the optical fiber connector adapters during the initial installation of the closure/terminal. Plugs 272 can be placed in the first side of the optical fiber connector adapters until a service connection at which time the plug can be removed from the optical fiber connector adapter where the connection will be made.

An integrated fiber polishing station 230 can be disposed in one of the first body portion or the second body portion of the exemplary enclosure. In the exemplary aspect shown in FIGS. 3 and 4, fiber polishing station 230 is integrated into second body portion 226 of terminal closure compartment 220. In an exemplary aspect, the polishing station 230 includes a base portion 231 that can be integrally formed by compressing a dual wall section 258 of the second body portion to form a depression. The base portion 231 supports one or more compliant pads 239 which provides a compliant polishing surface beneath the polishing media 250 on a polishing platform 232 and includes a holding ring 235 disposed around the circumferential edge of the base portion of the polishing platform. Compliant pad 239 can be adhesively secured to the base portion by a double sided tape, a transfer adhesive, a contact cement, etc. Alternatively, the compliant pad(s) can be secured in the polishing platform by holding ring 235. Holding ring 235 can be permanently connected to the base portion of the polishing platform by a structural adhesive such as an epoxy adhesive, a contact cement or an acrylic adhesive, for example, or the holding ring can be ultrasonically welded to the base portion of the polishing platform.

Figure 4:
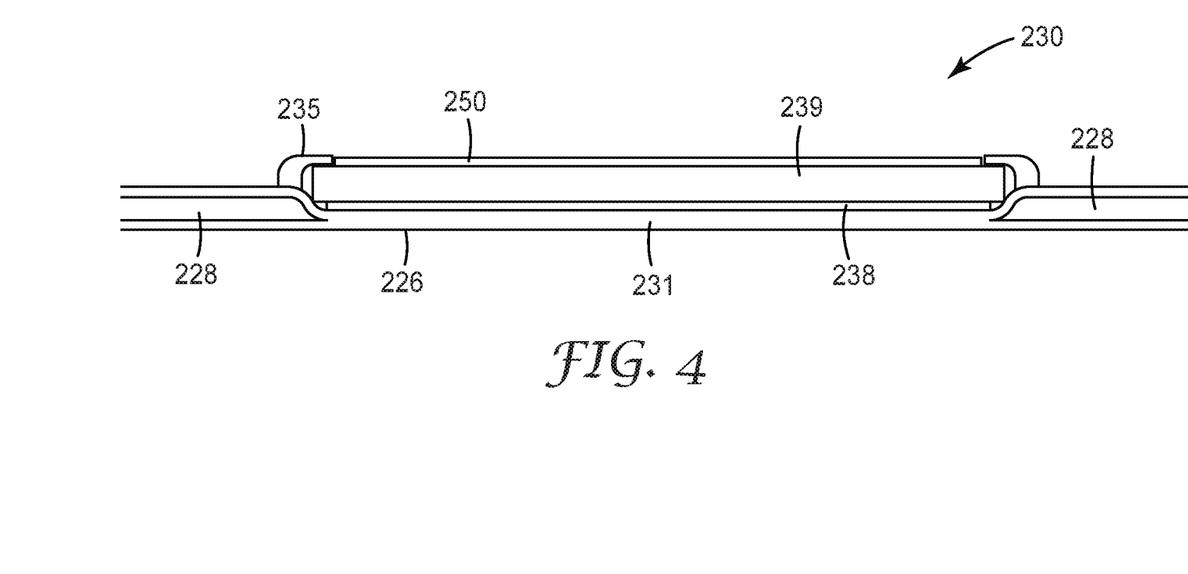
FIG. 4 is cross-sectional detail view of a telecommunication enclosure of FIG. 3.

In a preferred aspect, the polishing media 250 can be backed by one or more compliant pads. Compliant pad 239 can have a thickness of about 6 mm and a hardness of about 30 Shore A to about 80 Shore A, preferably about 45 shore A to about 75 shore A. However, the thickness of the compliant pad may vary depending on the depth of the annular channel, desired final fiber protrusion from the end of a connector ferrule after polishing as well as other system design criteria. In an exemplary aspect, the compliant pad can be made of rubber, for example, a silicone rubber material. In an alternative aspect, two compliant pads (not shown) can be utilized. In this instance, the physical properties of each pad can be altered to provide the desired polishing surface. Polishing media 250 can be held temporarily to the surface of the compliant pad 239 by applying a small amount of water to the surface of the compliant pad and setting the polishing media on top. Alternatively, an adhesive backed polishing media can be used. In an exemplary aspect, an adhesive backed polishing media can be placed on the polishing platform.

In the exemplary aspect shown in FIG. 3, an elliptically shaped piece of polishing media 250 can be used. The polishing media 250 can comprise a conventional polishing media or material as described previously. The polishing media 250 can be used in conjunction with a dry polish or a wet polish (e.g. water or alcohol). After a polishing operation is completed, the polishing media 250 can be removed from the polishing platform and replaced with a new piece of polishing media for the next polishing operation.

If another connector is to be prepared, a new piece of polishing media can be removed from the resealable media storage envelope 280 shown in FIG. 3. In an exemplary aspect, the resealable media storage envelope can be a plastic bag having a zipper style closure 282. The resealable media storage envelope can be secured to one of the first or second body portions of the terminal closure compartment of closure/terminal 200 by a double sided tape or a transfer adhesive 285.

FIG. 3 shows an optical fiber connector 50 disposed in polishing puck 260. Polishing puck 260 comprises a circular foot 262 and a connector mount positioned on top of the circular foot. The larger foot on the polishing puck helps ensure that the connector is held at the correct angle relative to the surface of polishing media 250. When the polishing puck 260 is used, the tip of the fiber protruding from the end of the connector ferrule is positioned against the polishing media 250 such that fiber tip experiences a contact force of from about 90 grams force to about 150 grams force against the polishing media, preferably about 130 grams.

A field mount connector 50 can be terminated on the end of cable 10 as follows. A strain relief boot can be threaded onto optical fiber cable 10. The optical fiber cable can be prepared by removing a terminal portion of the cable jacket. The fiber can then be stripped of its buffer coating using a conventional fiber cable stripper to expose the glass portion of the optical fiber. The fiber can be cleaved and then guided into and through optical fiber connector until the tip of the optical fiber exits the end face of ferrule. The fiber is secured is either mechanically or adhesively secured in the connector and the boot positioned on the backside of the connector opposite the ferrule. Optical fiber connector 50 is thus ready for polishing and can be inserted in the connector mount 265 of the polishing puck 260.

Polishing puck 260 is placed onto the polishing platform and moved across the surface in a figure-8 or circular motion until the desired level of surface finish on the end of the optical fiber disposed at the ferrule end face is achieved. Thus, the length of the polish process is determined by the number of circuits made across polishing platform 230.

After polishing the optical fiber connector is extracted from the polishing puck and inserted into optical fiber connector adapter 270 to make the optical connection with another optical fiber connector.

The polishing puck can be stowed in the closure/terminal by placing it in or on a puck containment structure (not shown).

Figure 5:
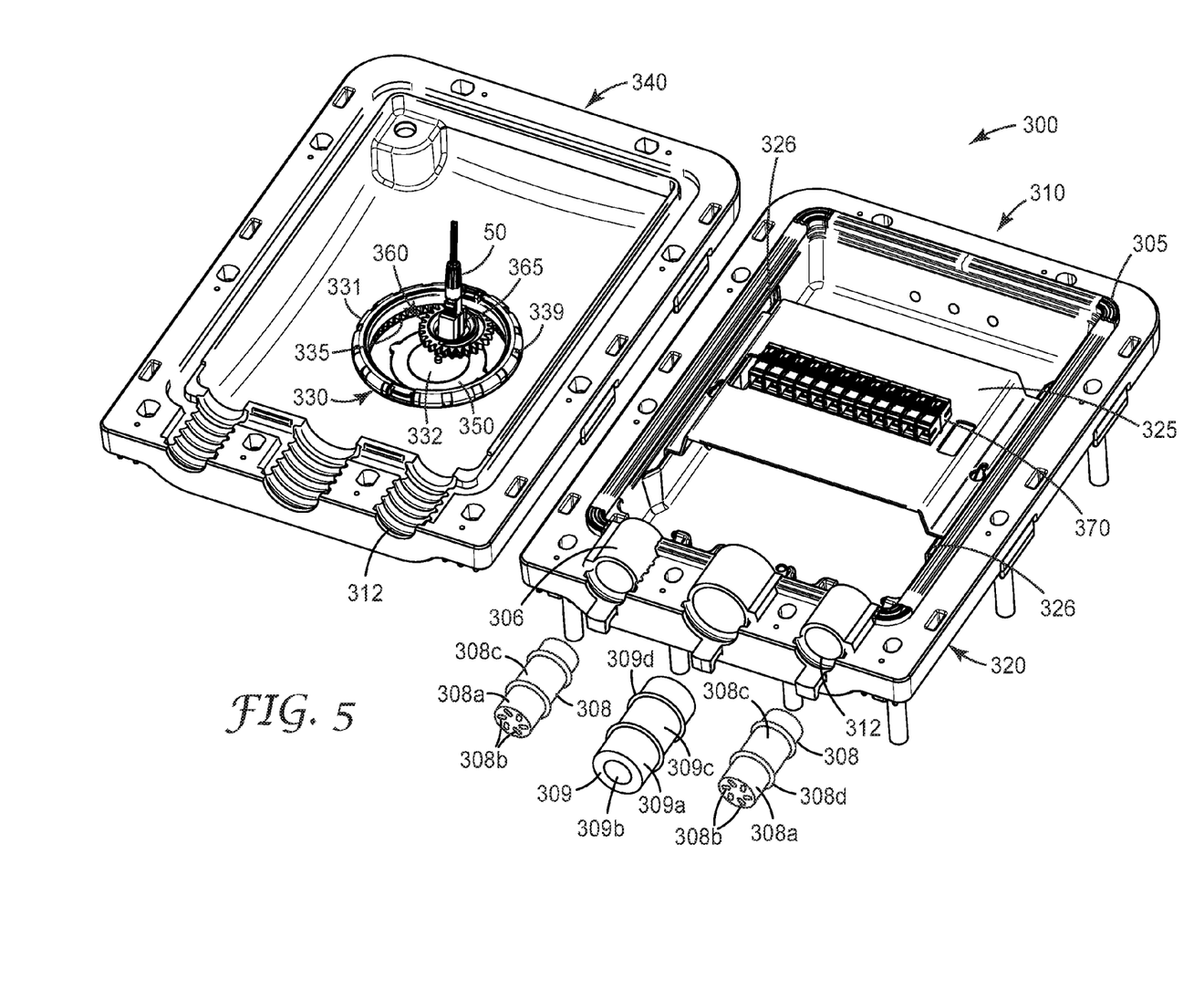
FIG. 5 is an isometric view of a third embodiment of a telecommunication enclosure having an integrated polishing platform according to the present description.

FIG. 5 shows a third embodiment of an exemplary enclosure, such as terminal closure 300. Terminal closure 300 includes an enclosure body 310 that includes a first body portion 320 and a second body portion 340 that are separable, but can be secured to one another by mechanical fasteners (e.g. bolts which are not shown in the figure). Entry ports 312 allow passage of a single cable, or multiple cables in combination with sealing member 308, 309. Terminal closure 300 is illustrated in FIG. 5 with three round entry ports (one half 312 of the entry port formed in the first body portion and the second half 312 of the entry port formed in the second body portion), but in other embodiments the terminal closure may have one, two, or any other number entry ports as is desired for a particular application.

Terminal closure 300 can be formed from any suitable material. Material selection will depend upon factors including, but not limited to, chemical exposure conditions, environmental exposure conditions including temperature and humidity conditions, and flame-retardancy requirements, to name a few. In one embodiment, terminal closure 300 is formed by injection molding a polypropylene resin that includes approximately 35% calcium carbonate and has a modulus of elasticity in the range of 175,000-300,000 psi.

A sealing gasket 305 is positioned between the first body portion 320 and the second body potion 340 to form a seal against the ingress of moisture, dust, insects, and the like into terminal closure 300 when first body portion and the second body potion are joined together, as by locking bolts, clamping members, and so on. Gasket 305 includes entry port portions 306 that surround the circumference of each entry port 312, so as to maintain the continuity of the gasket and resulting seal around the periphery of the terminal closure. In one embodiment, entry port portions 306 include longitudinal slits extending therethrough to permit the entry port portion of the gasket to be opened and sealing members 308, 309 to be laid therein. In other embodiments, where the material of gasket 305 is sufficiently resilient, slits are not provided in entry port portions of the gasket, and sealing member is simply inserted through entry port portion by stretching entry port portion of gasket. Gasket 305 can be formed from any suitable material, such as elastomeric and polymeric materials, such as thermoplastic elastomers, vulcanite rubbers, polyurethane foams, reactive and non-reactive polymers, silicones, EPDMs, and soft plastics, to name a few. Material selection will depend upon factors including, but not limited to, chemical exposure conditions, environmental exposure conditions including temperature and humidity conditions, and flame-retardancy requirements, to name a few.

Sealing members 308, 309 have an elastomeric interior portion 308*a*, 309*a* having at least one passage 308*b*, 309*b* extending therethrough that is at least partially surrounded by a hard or rigid exterior portion 308*c*, 309*c*. In the exemplary aspect shown in FIG. 5, sealing member 309 has one passage 309*b* extending through the elastomeric interior portion 309*a* and is configured to accept an optical fiber distribution cable. Each of sealing members 308 have six passages 308*b* extending through elastomeric interior portion 308*a* and are configured to accept up to six optical fiber drop cables each. The rigid exterior portion 308*c*, 309*c* provides a rigid sealing surface for the soft, pliable material of gasket 305 when clamped in entry port 312 of terminal closure 300. Annular ridges 308*d*, 309*d* extend circumferentially about exterior portion 308*c*, 309*c* of sealing member 308, 309 to capture entry port portion 306 of gasket 305 therebetween when the sealing member 10 is placed in entry port 312 preventing the soft, pliable gasket from herniating along the axis of the entry port 312.

Terminal closure 300 further includes an adapter retainer 325 mounted across the open face of the first body portion 320 that is configured to accept and retain a plurality of optical fiber connector adapter 370. In this way, space is provided for slack storage of the optical fiber drop cables and/or the distribution cable in the first body portion beneath the adapter retainer. The adapter retainer can be formed of bent and stamped sheet metal such that the end of the adapter retainer can be fitted into holding slots 326 disposed along opposite sides of the first body portion. Adapter retainer 325 forms a patch panel that supports the plurality of optical fiber connector adapters 370 configured to interconnect optical fiber connectors of disposed on the terminal ends of optical fibers from the distribution cable to optical fiber connectors disposed on the terminal end of drop lined or cables. Those skilled in the art will recognize that connectors on either the spliced lines or the drop lines can be any suitable connector such as a field mountable optical fiber connector. For example, the optical fiber connectors can be SC, ST, FC or LC format connectors, and may be, for example, either positive contact (PC) or angled polished connector (APC) types of connectors.

In an alternative aspect, at least one optical fiber from the distribution fiber can be connected to the input of an optical splitter and optical fiber connectors disposed on the exiting side of the splitter can be inserted into one side of the patch panel and connected optical fiber connectors disposed on the terminal end of drop lined or cables.

The optical fibers connectors on any of the optical fiber drop cables, the optical fibers from the distribution cable or the optical fiber connectors associated with the splitter can be field mountable optical fiber connectors. To facilitate the termination of the optical fiber connectors, terminal closure 300 can include integrated tooling such as fiber polishing station 330 which can be integrally molded into second body portion 340 of the terminal closure 300. Because the second body portion is separable from the first body portion, the second body portion can be used as a work surface that the craftsman doing the installation of the terminal closure can put in their lap, tripod or other support during connector termination.

Fiber polishing station 330 is substantially the same as fiber polishing station 130 shown in FIGS. 1 and 2. The polishing station 330 includes a base portion 331 that is integrally molded into the second body portion of terminal closure 300. The base portion supports a piece of polishing media 350 on a polishing platform 332 and includes a ring gear 335 having a plurality of interior teeth disposed along an interior circumferential edge. The fiber polishing station includes a rim 339 that forms a lip that extends over the interior teeth of the ring gear to ensure that proper positioning of the polishing puck 360 when the polishing apparatus is being used to finish an optical fiber connector prior to being put into service. The lip extends beyond the interior circumferential edge of the ring gear to guide and retain the polishing gear while polishing the tip of the optical fiber.

Polishing puck 360 and the method of using fiber polishing station is essentially the same as described above with respect to polishing puck 160 and the fiber polishing station 130.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A communication enclosure, comprising:
an enclosure body that includes a first body portion and a second body portion, wherein the second body portion is hingeably attached to the first body portion to provide access to an interior of the communication enclosure;
an adapter mounting mechanism disposed on the first body portion;
a connector adapter mounted into the mounting mechanism that is configured to accept an optical fiber connector; and
at least one integrated tool configured for use in mounting a field mountable optical fiber connector on an optical fiber cable wherein a base portion of the at least one integrated tool is integrally molded in one of the first body portion and the second body portion.

2. The enclosure of claim 1, wherein the at least one integrated tool is a connector polishing platform.

3. The enclosure of claim 2, wherein the optical connector polishing platform comprises a base portion to support a polishing media, and a polishing puck having a connector mount, to receive and hold the optical fiber connector secured to a terminal end of an optical fiber.

4. The enclosure of claim 3, wherein the connector mount is rotatably disposed in a polishing gear that engages with a ring gear disposed in the base portion such that a fiber tip of optical fiber disposed on the optical fiber connector traces a roulette pattern on the polishing media upon rotational engagement of the polishing gear within the ring gear.

5. The enclosure of claim 4, wherein the connector mount is asymmetrically mounted in the polishing gear.

6. The enclosure of claim 4, wherein the ring gear has a plurality of interior teeth disposed along an interior circumferential edge of the ring gear; and wherein the polishing gear has a plurality of exterior teeth protruding from the circumferential edge of the polishing gear that engage with the interior teeth of the ring gear of the polishing platform and wherein a ratio of interior gear of the base portion of the housing to the exterior teeth on the polishing gear has a non-integer value.

7. The enclosure of claim 3, further comprising one or more compliant backing pads disposed between the polishing media and the base portion of the optical connector polishing platform.

8. The enclosure of claim 3, wherein the connector is held in the mount at a predetermined angle, the predetermined angle providing for one of a flat polish that is perpendicular to the longitudinal direction of the fiber and an angled polish.

9. The enclosure of claim 8, wherein the angled polish comprises an angle from perpendicular from about 2° to about 12°.

10. The enclosure of claim 8, wherein a portion of the optical connector polishing platform in integrally molded in one of the first body portion and the second body portion.

11. The enclosure of claim 1, further comprising a slack storage system for retaining excess lengths of optical fiber.

12. The enclosure of claim 11, wherein the slack storage system includes a plurality of retention tabs disposed periodically around the base portion of the integrated tool to guide and retain the excess lengths of optical fiber.

13. The enclosure of claim 1, wherein the mounting mechanism is configured to accept a plurality of connector adapters.

14. The enclosure of claim 1, wherein the enclosure is a network interface device.

15. The enclosure of claim 1, wherein the enclosure is a terminal.

16. The enclosure of claim 1, wherein the enclosure is a closure/terminal.

17. The enclosure of claim 1, further comprises a plurality of cable entries having a sealing member disposed therein through which the optical fiber cable passed when entering the enclosure.

18. The enclosure of claim 17, further comprising a strain relief device positioned at each cable entry.

19. The enclosure of claim 17, wherein the polishing platform has an elliptical shape.

* * * * *